(12) United States Patent
Elzur

(10) Patent No.: US 11,405,464 B2
(45) Date of Patent: Aug. 2, 2022

(54) POLICY CONTROLLED SEMI-AUTONOMOUS INFRASTRUCTURE MANAGEMENT

(71) Applicant: Intel Corporation, Santa Clara, CA (US)

(72) Inventor: Uri Elzur, Irvine, CA (US)

(73) Assignee: Intel Corporation, Santa Clara, CA (US)

(*) Notice: Subject to any disclaimer, the term of this patent is extended or adjusted under 35 U.S.C. 154(b) by 945 days.

(21) Appl. No.: 15/720,883

(22) Filed: Sep. 29, 2017

(65) Prior Publication Data

US 2019/0104182 A1 Apr. 4, 2019

(51) Int. Cl.

| | |
|---|---|
| *H04L 67/125* | (2022.01) |
| *H04L 67/01* | (2022.01) |
| *G06N 20/00* | (2019.01) |
| *H04L 41/5009* | (2022.01) |
| *H04L 41/5025* | (2022.01) |
| *H04L 41/16* | (2022.01) |

(Continued)

(52) U.S. Cl.
CPC .......... *H04L 67/125* (2013.01); *G06N 20/00* (2019.01); *H04L 41/16* (2013.01); *H04L 41/5009* (2013.01); *H04L 41/5025* (2013.01); *H04L 67/42* (2013.01); *G06N 3/08* (2013.01); *H04L 41/0246* (2013.01)

(58) Field of Classification Search
CPC ....... H04L 67/12–67/125; H04L 67/40–67/42; H04L 41/16; H04L 41/50–41/5025; G06N 20/00

See application file for complete search history.

(56) References Cited

U.S. PATENT DOCUMENTS

| | | | |
|---|---|---|---|
| 2010/0274637 A1* | 10/2010 | Li ........................ | H04L 41/147 379/265.06 |
| 2016/0300142 A1* | 10/2016 | Feller .................... | G06N 20/00 |
| 2017/0149681 A1* | 5/2017 | Chen ..................... | G06F 9/46 |

(Continued)

OTHER PUBLICATIONS

Hong et al., "Application-aware Resource Allocation for SDN-based Cloud Datacenters", 2013, IEEE, 2013 International Conference on Cloud Computing and Big Data, pp. 106-110 (Year: 2013).*

(Continued)

*Primary Examiner* — Clayton R Williams
(74) *Attorney, Agent, or Firm* — Compass IP Law PC

(57) ABSTRACT

Embodiments of the present disclosure may relate to an apparatus for infrastructure management with an interface to receive a plurality of telemetry signals from first one or more infrastructure components of an infrastructure; and a policy controlled semi-autonomous (PCSA) infrastructure evaluator coupled with the interface, where the PCSA infrastructure evaluator includes a machine-learning (ML) model of service level metric (SLM) deviation by second one or more application or infrastructure components of the infrastructure and the PCSA infrastructure evaluator is to: determine a deviation from a SLM of third one or more infrastructure components based at least in part the ML model and one or more of the plurality of telemetry signals; and send a message, based at least in part on the deviation from the SLM. Other embodiments may be described and/or claimed.

21 Claims, 5 Drawing Sheets

(51) Int. Cl.
    *H04L 41/0246*    (2022.01)
    *G06N 3/08*         (2006.01)

(56) References Cited

U.S. PATENT DOCUMENTS

2017/0230267 A1*   8/2017   Armolavicius  ......... H04L 41/20
2017/0353361 A1*  12/2017   Chopra  .................. H04L 43/00

OTHER PUBLICATIONS

Pawar et al., "Priority Based Dynamic resource allocation in Cloud Computing", 2012, IEEE, 2012 International Symposium on Cloud and Services Computing, pp. 1-6 (Year: 2012).*
Uri Elzur et al., "IDF16 Intel Developer Forum—Innovative Use of Analytics and Machine Learning: Network Function Virtualization (NFV), Security and Optimized Infrastructure", Aug. 2016, 42 pages.
K. Ma et al., "Spendthrift: Machine learning based resource and frequency scaling for ambient energy harvesting nonvolatile processors," 2017 22nd Asia and South Pacific Design Automation Conference (ASP-DAC), 2017.
R. Alvizu, S. Troia, G. Maier, and A. Pattavina, "Matheuristic With Machine-Learning-Based Prediction for Software-Defined Mobile Metro-Core Networks," J. Opt. Commun. Netw. 9, D19-D30 (2017).

* cited by examiner

POLICY CONTROLLED SEMI-AUTONOMOUS INFRASTRUCTURE MANAGEMENT

FIELD

Embodiments of the present disclosure generally relate to the field of computer and network infrastructure management and, more particularly, to semi-autonomous control of network infrastructure resources.

BACKGROUND

Typically, legacy or cloud data centers, edge computing systems, and network function virtualization (NVF) infrastructure (NFVI) systems have capacity (e.g., processor cores, memory, network data throughput, data storage) allocated to various functions and/or clients before use in a static manner. This may result in inefficient utilization of hardware resources.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
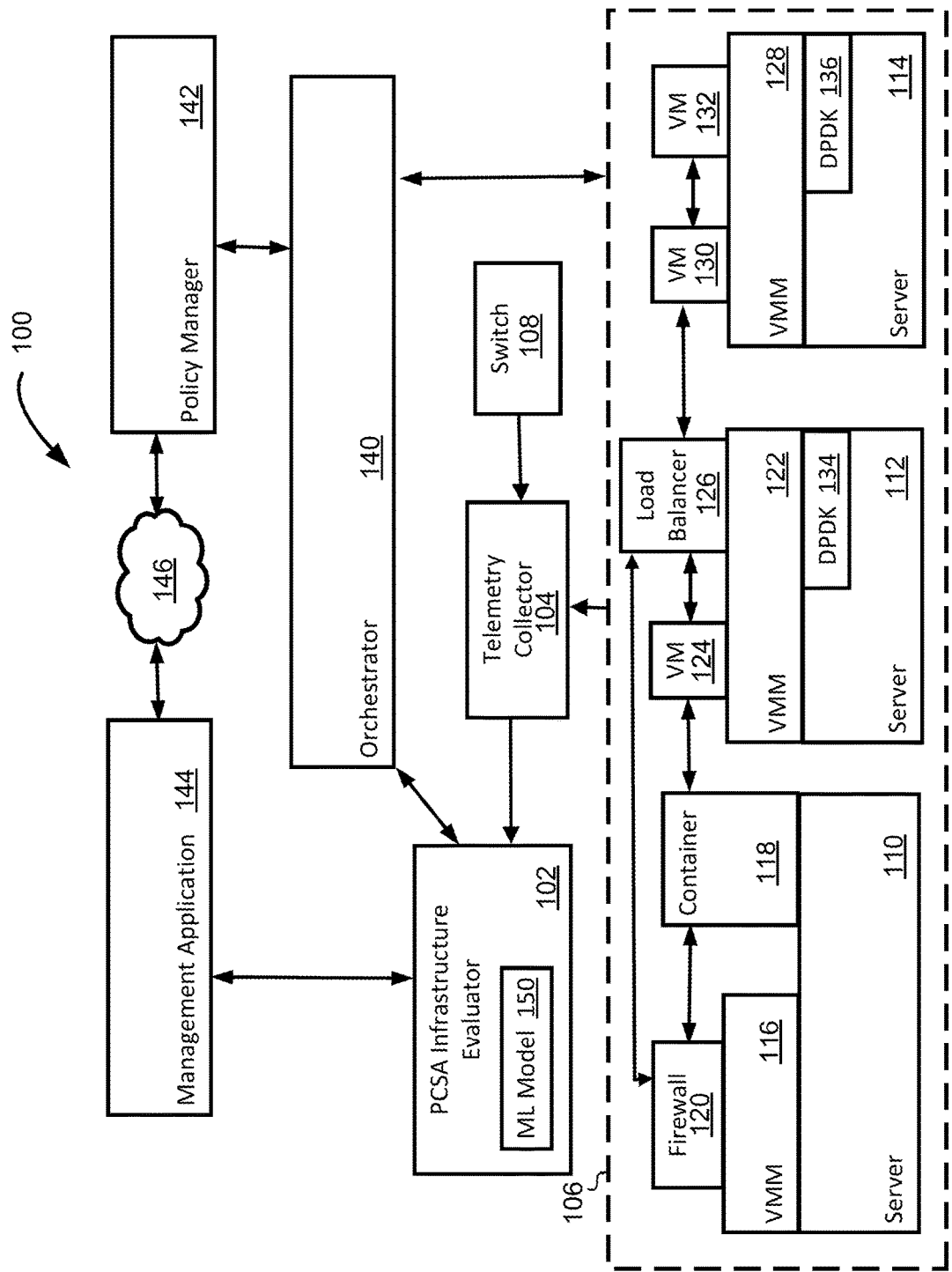
FIG. 1 depicts a block diagram of an apparatus that includes a policy controlled semi-autonomous infrastructure evaluator, in accordance with various embodiments.

Embodiments of the present disclosure may relate to an apparatus for infrastructure orchestration (including network infrastructure) management with a network interface to receive a plurality of telemetry signals from first one or more infrastructure components of an infrastructure and a policy controlled semi-autonomous (PCSA) infrastructure evaluator coupled with the network interface, where the PCSA infrastructure evaluator includes a machine-learning (ML) algorithm, a plurality of ML algorithms, and/or one or more ML models. In some embodiments, one or more of the ML algorithms and/or ML models may model the infrastructure utilized and/or one or more "services" that may include a desired service level agreement (SLA) or service level objective (SLO). In some embodiments, the term service level metric (SLM) may be used to refer to a SLA, a SLO, and/or one or more SLA parameters or SLO parameters. In some embodiments, the one or more "services" (e.g., SLA and/or SLO) may be inserted by a user or administrator, or may be inserted automatically by an application representing a set of "services", applications, virtual network functions (VNFs), containers, micro-services, functions, and/or any other suitable service that may be executed on the infrastructure monitored by the PCSA infrastructure evaluator. In some embodiments, a container may include but not be limited to an isolated user-space instance (e.g., as provided by a kernel in operating-system-level virtualization). In some embodiments, the "services" may also include a desired resource allocation. In various embodiments, the infrastructure telemetry may be "compacted" to include only those signals holding information pertinent to a potential SLA deviation by second one or more components of the infrastructure. In some embodiments, the PCSA algorithms may derive an indication of existing or imminent SLA deviation from the compacted telemetry, one or more infrastructure and service models (optional), and the desired SLA. In some embodiments, the PCSA infrastructure evaluator may be to determine a deviation from a SLA of third one or more infrastructure components based at least in part the ML model, one or more of the plurality of telemetry signals, and one or more SLA parameters; and send a message to a predefined entity. In some embodiments, the predefined entity may be selected from a group that includes an orchestrator, a cloud computing fabric controller, a network functions virtualization (NFV) orchestrator (NFVO), a virtualized infrastructure manager (VIM), an operations support system (OSS), a business support system (BSS), or an application (e.g., an Element Management System (EMS), a VNF Manager (VNFM), or some other management application), based at least in part on an actual or imminent deviation from the SLA or SLO. In some embodiments, the message may include a recommended action; the telemetry signals may include one or more of processor telemetry signals, operating system telemetry signals, virtual switch telemetry signals, storage subsystem telemetry signals, host bus adapter (HBA)/network interface card (NIC) telemetry, platform telemetry (e.g., temperature, fan state, baseboard management controller (BMC) state), physical switch or router telemetry, and/or any other suitable telemetry signals; the resource requirements may include one or more requirements or commitments of a number of processor cores, a cache capacity, a memory capacity, a memory bandwidth, a network data communication throughput capacity, or a storage capacity of the third one or more network components of the network infrastructure; and/or the SLA/SLO requirements may include transactions per second, input/output (IO) operations per second, network packets per second, network bandwidth, remote procedure calls (RPCs) per second, and/or any other suitable requirements. In some embodiments, one or more of the SLA/SLO requirements may be set or determined as a function of an allocated resource set. In some embodiments, telemetry may include but not be limited to any communication indicating a parameter about a component of the infrastructure.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

FIG. 1 depicts a block diagram of an apparatus 100 that includes a policy controlled semi-autonomous (PCSA) infrastructure evaluator 102, in accordance with various embodiments. In some embodiments, the PCSA infrastructure evaluator 102 may receive telemetry signals from a telemetry collector 104. Although the telemetry collector 104 is shown as being separate from the PCSA infrastructure evaluator 102, the telemetry collector 104 may be a part of the PCSA infrastructure evaluator in some embodiments. In some embodiments, the telemetry collector 104 may be or include a network interface. In various embodiments, the telemetry collector 104 may collect telemetry signals from one or more infrastructure components. In some embodiments, the telemetry collector 104 may collect telemetry signals from a group of servers 106 and/or other network components such as a switch 108. In various embodiments, the telemetry signals may include one or more of processor telemetry signals, operating system telemetry signals, virtual switch telemetry signals, storage subsystem telemetry signals, host bus adapter telemetry signals, network interface card telemetry signals, platform telemetry signals, physical switch telemetry signals, router telemetry signals, or any other suitable type of telemetry signals. In some embodiments, the telemetry signals may include one or more of a packet loss metric or a collision metric that provides a count, a count per unit time, any other suitable measurement of cache resources collisions, central processing unit (CPU) resource utilization, memory utilization, and/or a counter relating to any other suitable metric. Although the PCSA infrastructure evaluator 102 is shown to be separate from other elements of the apparatus 100, in some embodiments, the PCSA infrastructure evaluator 102 may co-reside with one or more of the other components of the apparatus 100 and/or network coupling between the PCSA infrastructure evaluator 102 and one or more other components may be virtual or based on an application programming interface (API).

In some embodiments, the group of servers 106 may include a first server 110, a second server 112, and a third server 114. In some embodiments, a virtual machine monitor (VMM) 116, a container 118 (e.g., a Docker container), and/or a virtual machine (VM) firewall 120 may run on the first server 110. In some embodiments, a VMM 122 may run on the second server 112. In various embodiments, one or more VMs, such as a first VM 124 may run on the VMM 122. In some embodiments, a load balancer VM 126 may run on the VMM 122 and/or the second server 112. In some embodiments, a VMM 128 may run on the third server 114. In various embodiments, one or more VMs, such as a second VM 130 and a third VM 132 may run on the VMM 128. In some embodiments, one or more of the VMM 116, the VMM 122, and/or the VMM 128 may be a hypervisor. Although a single container 118 is shown for clarity, it should be understood that multiple containers may be included in various embodiments and/or that any suitable combination of containers and/or VMs may be used.

In some embodiments, one or more components running on one or more of the servers in the group of servers 106 may be communicatively coupled with and/or may provide services to components running on one or more of the other servers. In some embodiments, the VM firewall 120 may act as a firewall for components running on the first server 110, as shown with respect to the container 118, but may also act as a firewall for components running on the second server 112 and/or the third server 114 such as for the first VM 124, the second VM 130, and/or the third VM 132 via the load balancer VM 126. In various embodiments, one or more of the servers in the group of servers 106 may include an environment abstraction layer (EAL) (e.g., with a first data plane development kit (DPDK) 134 on the second server 112 and/or a second DPDK 136 on the third server 114). In some embodiments, the EAL may provide a generic interface to low-level resources such as hardware and memory space, and may hide the environment specifics from applications and libraries. In some embodiments, the EAL may provide one or more services that may include DPDK loading and launching, support for multi-process and multi-thread execution types, core affinity/assignment procedures, system memory allocation/de-allocation, atomic/lock operations, time reference, peripheral component interconnect (PCI) bus access, trace and debug functions, CPU feature identification, interrupt handling, and/or alarm operations. In some embodiments, the PCSA infrastructure evaluator 102 may receive one or more policy parameters (e.g., SLA, SLO, and/or resource requirements) from a policy manager 142 directly or via an orchestrator 140. In some embodiments, one or more of the one or more policy parameters may correspond to a higher-level policy (e.g., a network level policy or a datacenter level policy) that may relate to infrastructure used to implement more than one SLA. In some embodiments, the PCSA infrastructure evaluator 102 may receive one or more parameters or models pertinent to the infrastructure used, directly from the infrastructure (e.g. reading BMC or inventory database), from the orchestrator 140, and/or from the administrator. In some embodiments, one or more of the one or more policy parameters may correspond to a policy that defines scale up, scale down, and/or a self-healing policy. Such a policy may also include a maximum number of servers that may be consumed in order to create a new virtual machine or container, a maximum percentage of a total number of servers that may create a new virtual machine or container, a maximum rate of instantiation of virtual machine or container instances, or any other suitable higher-level policy. Correspondingly, a scale down policy may include a minimal infrastructure set to host a "service" or application. That policy may reside within the PCSA infrastructure evaluator 102 or with the orchestrator 140, for example, and may be accessible to the orchestrator 140 and/or the PCSA infrastructure evaluator 102 in some embodiments. In some embodiments, one or more of the one or more policy parameters may correspond to one or more permission policies that may establish whether permission is required before the PCSA infrastructure evaluator 102 and/or the orchestrator 140 may take a particular action (e.g., sending a message from the PCSA infrastructure evaluator 102 to the orchestrator 140 directing a change in resources; or directing, by the orchestrator 140, one or more components of the infrastructure to take an action). In various embodiments, the higher-level policy may include, but not be limited to, a manner in which one or more components of the infrastructure (e.g., one or more servers or features thereof in the group of servers 106) are to be operated. In some embodiments, the higher-level policy may include, but not be limited to, a manner in which disaggregated resources (e.g., compute, storage, memory, network, and any other suitable resources) are to be operated. In various embodiments, the higher-level policy may include, but not be limited to, a manner in which one or more components of the infrastructure are to be operated in relation to an application and/or a SLM.

In various embodiments, the orchestrator 140 may be in data communication with the group of servers 106, the policy manager 142, and the PCSA infrastructure evaluator 102. In some embodiments, a management application 144 may be in data communication with the policy manager 142 over a network 146, that may be a cloud computing network. In some embodiments, cloud computing may refer, but not be limited, to an information technology paradigm, a model for enabling ubiquitous access to shared pools of configurable resources (such as computer networks, servers, storage, applications and services), which can be rapidly provisioned with minimal management effort, often over the Internet. Although a single management application 144 is shown for clarity, it should be understood that multiple management applications may be included in various embodiments. In various embodiments, the PCSA infrastructure evaluator 102 may be in data communication with the management application 144. In some embodiments, the capabilities (e.g., storage, processing, memory) of one or more servers in the group of servers 106 may be communicated to the orchestrator 140 and/or the policy manager 142 (e.g., by using enhanced platform awareness (EPA) parameters as exemplified in OpenStack open source or by following an Information Model (IM) or Data Model (DM), as prescribed by the European Telecommunications Standards Institute (ETSI) and/or the Organization for the Advancement of Structured Information Standards (OASIS) Topology and Orchestration Specification for Cloud Applications (TOSCA)). In some embodiments, the orchestrator 140 may be a network functions virtualization (NFV) orchestrator (NFVO).

In some embodiments, the PCSA infrastructure evaluator 102 may include one or more ML algorithms and/or one or more ML models 150. In some embodiments, the ML model 150 may be a model of SLA deviation for some VM or Container or micro service or Function-as-a-Service (FaaS) or of a more complex set of components corresponding to a Network Service (NS) or other "service" or larger application comprised of a set of such components executed by one or more infrastructure components (e.g., components of the group of servers 106 and/or the switch 108.) In various embodiments, the ML model 150 may include weighting parameters that may be for an artificial neural network (ANN) or any other suitable type of ML model. In some embodiments, the ML model 150 may be trained during a training phase to identify telemetry signals and/or other data to be included in the ML model 150 and/or weights to be associated with the telemetry signals and/or other data. In various embodiments, the ML model 150 may be a binary classification model, a multiclass classification model, a regression model, or any other suitable type of ML model. In some embodiments, the PCSA infrastructure evaluator 102 and/or one or more other infrastructure elements (e.g., server 110, 112, 114 or other infrastructure components such as a physical switch and/or one or more storage nodes), may include a filter, not shown for clarity, to filter the plurality of telemetry signals received from the telemetry collector 104 based at least in part on the ML model 150 to determine a subset of the telemetry signals that may be used in one or more further determinations or actions by the PCSA infrastructure evaluator 102. In some embodiments, only those telemetry signals that contribute to an ability of the PCSA infrastructure evaluator 102 to determine the SLA/SLO deviation may be generated by the infrastructure components, thereby reducing the load on those elements as well as on the infrastructure used to convey these signals to the telemetry collector 104 and/or the PCSA infrastructure evaluator 102 itself. In some embodiments, an ML algorithm in the PCSA infrastructure evaluator 102, based on the training phase or from other sources, pertinent to the infrastructure used and/or SLA/SLO and/or applications or services run, may be used to determine the set of telemetry signals to be created and/or collected. In some embodiments, a minimal set of telemetry signals required for determining SLA/SLO deviation may be used and/or created.

Although the PCSA infrastructure evaluator 102 may be described with respect to an SLA or an SLO, it should be understood that the PCSA infrastructure evaluator 102 may perform actions based at least in part on and/or with respect to any suitable type of SLM in various embodiments, such that discussion of an SLA and/or deviation from an SLA should also be understood to apply to an SLO or deviation from an SLO in some embodiments. In various embodiments, the PCSA infrastructure evaluator 102 may determine a deviation from a service level agreement (SLA) based at least in part on the ML model 150, one or more of the plurality of telemetry signals received from one or more infrastructure components and/or network components, and one or more SLA, SLO, and/or policy parameters. In some embodiments, the SLA may include one or more performance, responsiveness, utilization efficiency, security or other metrics of the SLA or SLO requested (e.g., as listed above). In some embodiments, the PCSA infrastructure evaluator 102 may also use a suitable algorithm (ML or not) to modify the infrastructure resources requested or committed (e.g., of one or more of a number of processor cores, a cache capacity, a memory capacity, a memory bandwidth, a network data communication throughput capacity, a storage capacity of one or more servers of server group 106, or any other suitable metric). In various embodiments, the PCSA infrastructure evaluator 102 may modify the infrastructure resources directly or indirectly (e.g., by issuing an indication or sending a message to the orchestrator 140) to modify one or more resources allocated to an application element in order to scale up, scale down, or migrate for preserving the desired SLA or SLO or deviating from it based on a given policy. In some embodiments, the PCSA infrastructure evaluator 102 algorithm may take into account a corresponding level of scale up or scale down of any given application component to achieve a new desired SLA or SLO level due to user or administrator input, or due to a change in the overall application (e.g., NS) load (e.g., number of requests, number of packets, number of RPC, and/or any other suitable metric). In some embodiments, the PCSA infrastructure evaluator 102 may receive one or more SLA parameters from the policy manager 142 via the orchestrator 140 that may correspond to the requirements and/or commitments of the SLA. In other embodiments, the policy manager 142 may directly interact with the PCSA infrastructure evaluator 102. In various embodiments, the PCSA infrastructure evaluator 102 may receive SLA parameters that may correspond to the requirements and/or commitments of more than one SLA, and in such embodiments, the PCSA infrastructure evaluator 102 may receive a plurality of SLA identification parameters, where each SLA identification parameter may be associated with a subset of the received SLA parameters (e.g., a first SLA identification parameter may be associated with a first subset of performance parameters, responsiveness parameters, utilization efficiency parameters, security parameters, and/or any other suitable metric of the SLA or SLO requested (as listed above), and a second SLA identification parameter may be associated with a second subset of performance parameters, responsiveness parameters, utilization efficiency parameters, security parameters, and/or any other suitable metric of the SLA or SLO requested (as listed above)).

In some embodiments, the PCSA infrastructure evaluator 102 may determine the deviation from the SLA based at least in part on the filtered subset of the telemetry signals (e.g., telemetry compaction). In some embodiments, the PCSA infrastructure evaluator 102 may determine the deviation from the SLA based at least in part on one or more of the one or more SLA parameters and/or may recommend action directly to the infrastructure or to the orchestrator 140 based at least in part on one or more of the one or more policy parameters. In some embodiments, input parameters to the ML model 150 may include one or more telemetry signals, one or more SLA parameters, and/or one or more policy parameters.

In various embodiments, the ML model 150 may generate one or more outputs based at least in part on the input parameters. In some embodiments, the one or more outputs of the ML model 150 may include one or more SLA deviation outputs. In various embodiments, the one or more SLA deviation outputs may include one or more deviation indicators and/or deviation probabilities. In some embodiments, the SLA deviation outputs may include one or more time values (e.g., 75% probability of deviating from a storage requirement in 10 seconds.) In some embodiments, the one or more deviation indicators and/or deviation probabilities may be associated with one or more of the one or more SLA parameters (e.g., 85% probability of deviating from a network bandwidth requirement of a first SLA). In various embodiments, the PCSA infrastructure evaluator 102 may determine deviation from the SLA in an application agnostic manner, where the PCSA infrastructure evaluator 102 may not know or take into account any of the particular applications or VNFs being run on the infrastructure under one or more SLAs. In some embodiments, deviation may include, but not be limited to, one or more components of the infrastructure exceeding a fixed resource limit.

In some embodiments, the PCSA infrastructure evaluator 102 may determine deviation from one or more SLAs in an application aware manner, where the PCSA infrastructure evaluator 102 may determine the deviation from an SLA based at least in part on one or more application parameters and/or application models (e.g., including some description of inter-component dependency and/or inter-performance relationships) or VNF parameters (e.g., an application type identifier and/or one or more telemetry signals from an application or VNF.) In some embodiments, the input parameters to the ML model 150 may include one or more of the application or VNF parameters. In some embodiments, the PCSA infrastructure evaluator 102 may determine the deviation from the SLA based at least in part on parameters from more than one application and/or VNF.

In some embodiments, the PCSA infrastructure evaluator 102 may send a message to one or more of the orchestrator 140, a cloud computing fabric controller, not shown for clarity, a virtualized infrastructure manager (VIM), not shown for clarity, an operations support system (OSS), not shown for clarity, a business support system (BSS), not shown for clarity, the management application 144, or any other suitable network component, based at least in part on the deviation from the SLA. In some embodiments, the message may include a recommended action (e.g., creation of a new VM or container instance or migration of an existing VM or container instance). In some embodiments, the recommended action may specify the type of identity of a VM to be created, scaled up, or scaled down and by how much. In various embodiments, this may be useful when an application is to scale by a certain amount and the PCSA infrastructure evaluator 102, aided or unaided, may determine which component of the application needs to scale and by how much to achieve the overall application desired SLA under a given policy. In some embodiments, the PCSA infrastructure evaluator 102 may determine the recommended action based at least in part on one or more outputs of the ML model 150. In some embodiments, the ML model 150 outputs may include one or more parameters that may correspond to one or more recommended actions (e.g., instantiate a new VM for a first SLA). In some embodiments, the deviation may be a predicted future deviation at a first time and the PCSA infrastructure evaluator 102 may be to send the message at a second time before the first time. In some embodiments, the message may include a statistics update for one or more of the one or more infrastructure or network components. In various embodiments, the PCSA infrastructure evaluator 102 may be to determine whether permission is required for the recommended action based at least in part on one or more of the one or more policy parameters (e.g., a policy parameter indicating that no more than a predefined percentage of servers may instantiate new VM or container instances), and the message may include a permission required indicator in response to a determination permission is required. In some embodiments, this may prevent too large a portion of the infrastructure from reacting to desired or spurious changes and engulfing the whole infrastructure in an uncontrolled action (either spinning up or down too many elements at once).

In some embodiments, the orchestrator 140 or some other component of the apparatus 100 (e.g., the management application 144) may direct one or more components operating on the group of servers 106 to take an action (e.g., create a new VM or container instance or migrate an existing VM or container instance) based at least in part on the message from the PCSA infrastructure evaluator 102. In various embodiments, this may be performed in a semi-autonomous manner, where the orchestrator 140 may direct one or more infrastructure components to take an action without further approval (e.g., from the user, administrator, a policy manager, a higher level of resource allocation, or an orchestration or service orchestration entity) in response to such a message from the PCSA infrastructure evaluator 102. As discussed above, in some embodiments, further approval may be required in some situations (e.g., where the permission required indicator indicates permission is required) before the orchestrator 140 may direct one or more infrastructure components to take an action. In some embodiments, the PCSA infrastructure evaluator 102 may take some actions without further approval and other actions after further approval (e.g., from the user, administrator, a policy manager, a higher level of resource allocation, or an orchestration or service orchestration entity), based at least in part on one or more permission policies, such that the PCSA infrastructure evaluator 102 may operate in a semi-autonomous manner. In various embodiments, the PCSA infrastructure evaluator 102 or the orchestrator 140 may notify the user, administrator, a policy manager, a higher level of resource allocation, or an orchestration or service orchestration entity of the action recommended and/or executed without an explicit permission from any of those higher layers (e.g., the policy manager 142, the management application 144, or a human operator). In various embodiments, the orchestrator 140 may manage one or more infrastructure components of the group of servers 106 and/or other infrastructure components of the apparatus 100 based at least in part on the PCSA infrastructure evaluator 102 generated messages.

Figure 2:
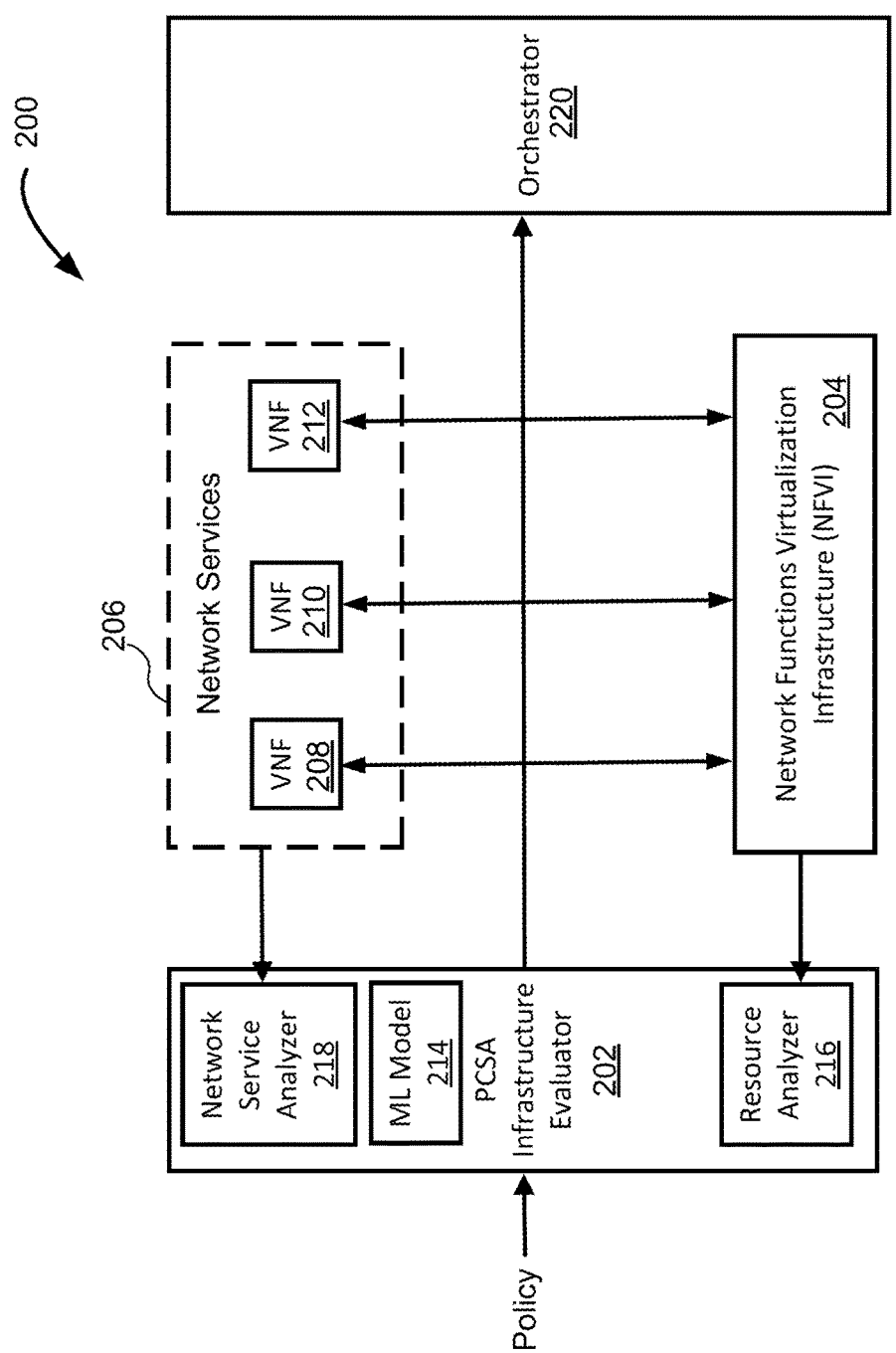
FIG. 2 depicts a block diagram of a system that includes a policy controlled semi-autonomous infrastructure evaluator that is associated with a network functions virtualization infrastructure, in accordance with various embodiments.

FIG. 2 depicts a block diagram of a system 200 that includes a PCSA infrastructure evaluator 202 that may be associated with a network functions virtualization infrastructure (NFVI) 204, in accordance with various embodiments. In some embodiments, the NFVI 204 may include hardware resources (e.g, compute, storage, and/or network resources) and a virtualization layer and/or Containers and/or FaaS or other types of compute applications. In some embodiments, one or more network services 206 may run on the NFVI 204 and/or be in communication with the NFVI 204. In some embodiments, the virtualization layer of the NVFI 204 may present virtual compute, virtual storage, and/or virtual network resources to the network services 206 such that they may run on the hardware resources of the NFVI 204 indirectly through the virtualization layer. In some embodiments, the network services 206 may include a first virtual network function (VNF) 208, a second VNF 210, and a third VNF 212. In some embodiments, one or more of the network services 206 may be evolved packet core services or other wireless telecommunications services. In some embodiments, the network services 206 may include a PGW, a SGW, a HSS, and/or a mobility manager. In some embodiments, the network services 206 may include one or more software defined networking (SDN) services. In various embodiments, the PCSA infrastructure evaluator 202 may include a ML model 214, a resource analyzer 216, and/or a network service analyzer 218. In some embodiments, the ML model 214 may be a binary classification model, a multiclass classification model, a regression model, or any other suitable type of ML model. In various embodiments, the ML model 214 may include some or all of the functionality described with respect to the ML model 150 of FIG. 1 and/or may be configured in a similar manner to the ML model 150.

In some embodiments, the resource analyzer 216 may receive a first set of one or more telemetry signals from the NFVI 204 and the network service analyzer may receive a second set of one or more telemetry signals from the network services 206 (e.g., from VNF 208, VNF 210, and/or VNF 212). In various embodiments, the resource analyzer 216 may analyze the first set of one or more telemetry signals based at least in part on the ML model 214 and/or the network service analyzer 218 may analyze the second set of one or more telemetry signals based at least in part on the ML model 214. In various embodiments, the ML model 214 may use a combination of network service signals and/or application awareness coupled with infrastructure based indication from the NFVI 204 as processed by the resource analyzer 216 to provide better insight, finer granularity, and/or a more refined indication or recommendation as to the action taken based on the combination of the network service analyzer 218 and resource analyzer 216 analysis. In various embodiments, the ML model 214 may include weighting parameters associated with an ANN or any other suitable type of ML model. In some embodiments, the ML model 214 may be trained during a training phase, and may incorporate weighting factors associated with one or more interactions between different network services (e.g., between the first VNF 208 and one or more of the second VNF 210 or the third VNF 212).

In some embodiments, the PCSA infrastructure evaluator 202 may determine one or more actions based at least in part on a policy input (e.g., from a policy manager such as policy manager 142), and one or more determinations from the resource analyzer 216 and/or the network service analyzer 218. In some embodiments, the PCSA infrastructure evaluator 202 may determine a deviation from a SLA based at least in part on the ML model 214, one or more SLA parameters, and one or more telemetry signals received from the network services 206 and/or the NFVI 204. In some embodiments, the PCSA infrastructure evaluator 202 may send a message to an orchestrator 220 based at least in part on the determined one or more actions and/or the determined deviation. In some embodiments, the orchestrator 220 may direct one or more components operating on the NFVI 204 to take an action (e.g., create a new VM or container instance or migrate an existing VM or container instance) based at least in part on the message. In some embodiments, the PCSA infrastructure evaluator 202 may take one or more additional or alternative actions similar to those described with respect to the PCSA infrastructure evaluator 102 of FIG. 1, and/or the orchestrator 220 may take one or more additional or alternative actions similar to those described with respect to the orchestrator 140 of FIG. 1.

In various embodiments, the ML model 150 of FIG. 1 and/or the ML model 214 of FIG. 2 may be statically configured after they have been trained, but may still allow for detection of telemetry signal patterns with respect to the PCSA infrastructure evaluator 102 and/or the PCSA infrastructure evaluator 202 that may correspond to a deviation from a SLA. In other embodiments, the ML model 150 and/or the ML model 214 may be dynamically configured and/or may continue to be updated by processes internal to the PCSA infrastructure evaluator 102 and/or the PCSA infrastructure evaluator 202 (e.g., other components of a ML model) or external to the PCSA infrastructure evaluator (e.g., by policy manager 142).

In various embodiments, a number of exemplary patterns (e.g., known good and/or known bad patterns) may be set by default in the ML model 150 and/or the ML model 214. In some embodiments, the exemplary patterns may allow the PCSA infrastructure evaluator 102 and/or the PCSA infrastructure evaluator 202 to react in advance of potential deviations from an SLA based on past learning. In some embodiments, processing by the ML model 150 and/or the ML model 214 may be performed with one or more observed parameters that may include continuous tracking of telemetry signals that may be event generated and/or correlation of telemetry signals accumulated in a predefined time period. In some embodiments, the PCSA infrastructure evaluator 102 and/or the PCSA infrastructure evaluator 202 may weight telemetry signals per predefined time interval, may detect possible deviations based on signature recognition of received telemetry signal patterns, and/or may include any other suitable working mode.

Figure 3:
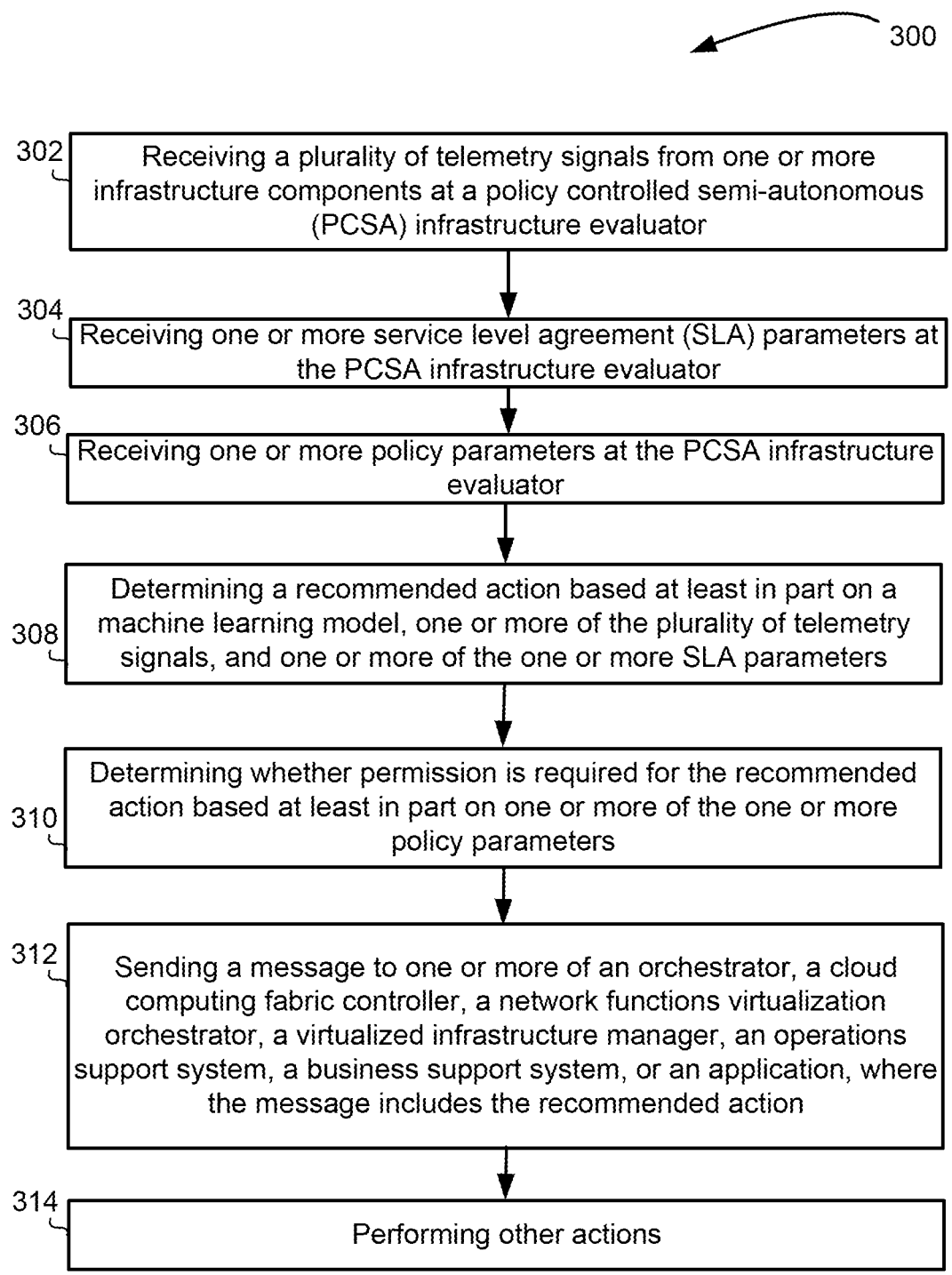
FIG. 3 is a flow diagram of a technique of infrastructure control with a policy controlled semi-autonomous infrastructure evaluator, in accordance with various embodiments.

FIG. 3 is a flow diagram of a technique 300 of infrastructure control with a policy controlled semi-autonomous infrastructure evaluator (e.g., PCSA 102 or PCSA 202), in accordance with various embodiments. In some embodiments, some or all of the technique 300 may be practiced by components shown and/or described with respect to the apparatus 100 of FIG. 1, the system 200 of FIG. 2, the computing device 400 of FIG. 4, or some other component described with respect to FIGS. 1-2 and/or FIGS. 4-5.

In various embodiments, at a block 302, the technique 300 may include receiving a plurality of telemetry signals from one or more infrastructure components at a PCSA infrastructure evaluator (e.g., PCSA infrastructure evaluator 102 or 202). In some embodiments, the technique 300 may include filtering the telemetry signals (e.g., by the PCSA infrastructure evaluator, by the telemetry collector 104, at the source on the infrastructure element, or by using another algorithm (e.g. ML algorithm) to determine a priori the telemetry signals appropriate for the action/decision or SLA/SLO deviation and generating just those signals at the infrastructure source) to determine a subset of the telemetry signals that may be used in one or more further determinations or actions.

In some embodiments, at a block 304, the technique 300 may include receiving one or more SLA parameters at the PCSA infrastructure evaluator (e.g., from policy manager 142, from the orchestrator 140, directly from a user/administrator, or through some other programmatic interface). In some embodiments, at a block 306, the technique 300 may include receiving one or more policy parameters at the PCSA infrastructure evaluator (e.g., from policy manager 142, from the orchestrator 140, directly from a user/administrator, or through some other programmatic interface). In various embodiments, at a block 308, the technique 300 may include determining a recommended action based at least in part on a machine learning model or algorithm (e.g., ML model 150 or 214), one or more of the plurality of telemetry signals, and one or more of the one or more SLA parameters. In some embodiments, at a block 310, the technique 300 may include determining whether permission is required for the recommended action based at least in part on one or more of the one or more policy parameters. In various embodiments, at a block 312, the technique 300 may include sending a message to one or more of an orchestrator, a cloud computing fabric controller, a network functions virtualization orchestrator, a virtualized infrastructure manager, an operations support system, a business support system, or a management application, where the message includes the recommended action. In some embodiments, at a block 314, the technique 300 may include performing other actions. Although much of the technique 300 is described with respect to an SLA and SLA parameters, it should be understood that the technique 300 may also apply to an SLO or any other SLM, including SLO parameters and deviation from an SLO in some embodiments.

Figure 4:
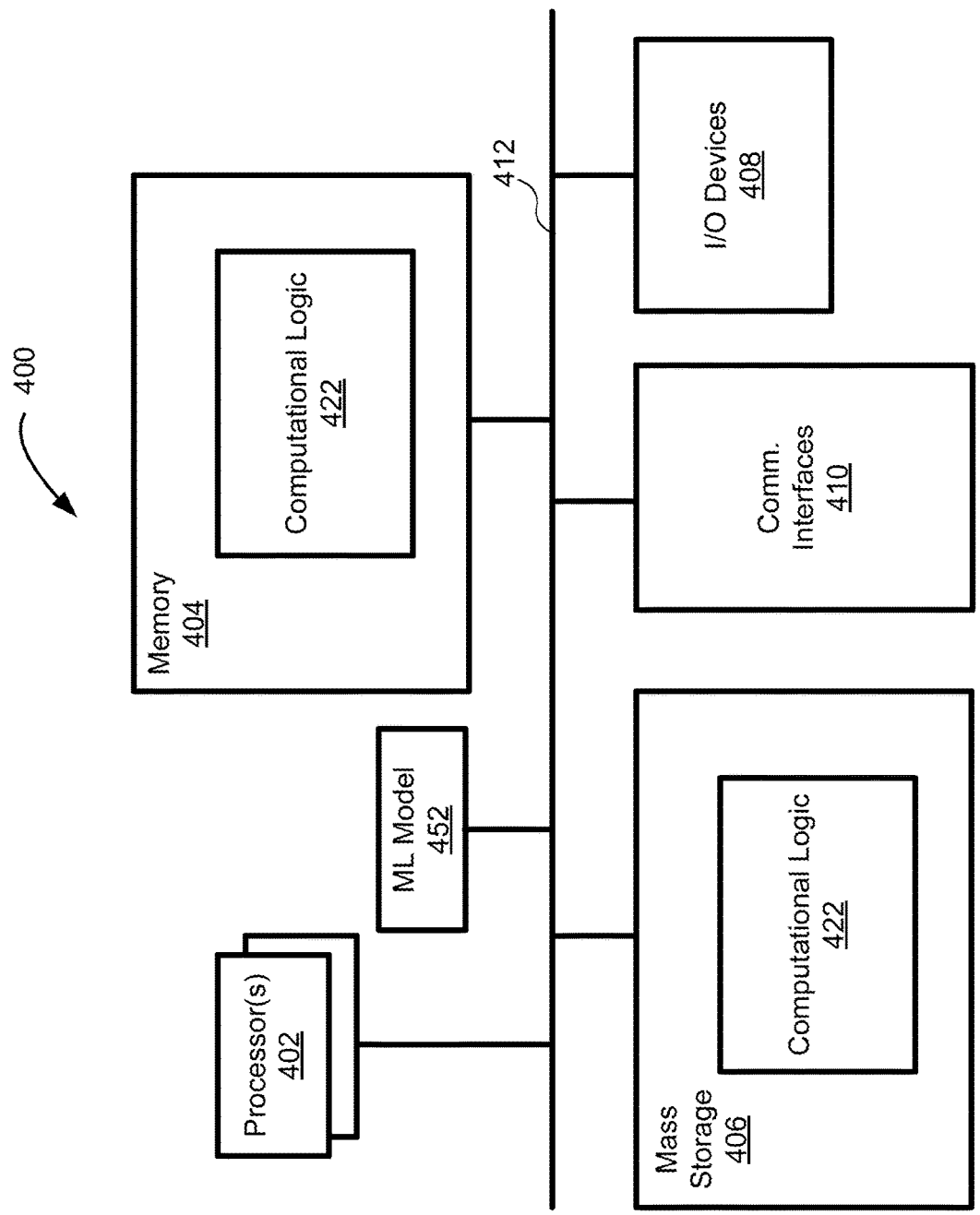
FIG. 4 is a block diagram that schematically illustrates a computing device, in accordance with various embodiments.

FIG. 4 illustrates a block diagram of an example computing device 400 suitable for use with various components of FIGS. 1-2, and/or the technique 300 of FIG. 3, in accordance with various embodiments. For example, the computing device 400 may be, or may include or otherwise be coupled to, apparatus 100, PCSA infrastructure evaluator 102, ML model 150, PCSA infrastructure evaluator 202, ML model 214, resource analyzer 216, and/or network service analyzer 218. As shown, computing device 400 may include one or more processors or processor cores 402 and system memory 404. For the purpose of this application, including the claims, the terms "processor" and "processor cores" may be considered synonymous, unless the context clearly requires otherwise. The processor 402 may include any type of processors, such as a central processing unit (CPU), a microprocessor, and the like. The processor 402 may be implemented as an integrated circuit having multi-cores, e.g., a multi-core microprocessor. In some embodiments, processors 402, in addition to cores, may further include hardware accelerators, e.g., hardware accelerators implemented with Field Programmable Gate Arrays (FPGA). The computing device 400 may include mass storage devices 406 (such as diskette, hard drive, non-volatile memory (NVM) (e.g., compact disc read-only memory (CD-ROM), digital versatile disk (DVD), any other type of suitable NVM, and so forth). In general, system memory 404 and/or mass storage devices 406 may be temporal and/or persistent storage of any type, including, but not limited to, volatile and non-volatile memory, optical, magnetic, and/or solid state mass storage, and so forth. Volatile memory may include, but is not limited to, static and/or dynamic random access memory (DRAM). Non-volatile memory may include, but is not limited to, electrically erasable programmable read-only memory, phase change memory, resistive memory, and so forth.

The computing device 400 may further include I/O devices 408 (such as a display (e.g., a touchscreen display), keyboard, cursor control, remote control, gaming controller, image capture device, and so forth) and communication interfaces 410 (such as network interface cards, modems, infrared receivers, radio receivers (e.g., Bluetooth), and so forth).

The communication interfaces 410 may include communication chips (not shown) that may be configured to operate the device 400 in accordance with a local area network (LAN) (e.g., Ethernet) and/or a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 410 may operate in accordance with other wireless protocols in other embodiments. In various embodiments, computing device may include a ML model 452 that may be configured in similar fashion to the ML model 150 described with respect to FIG. 1 or the ML model 214 described with respect to FIG. 2. In some embodiments, the ML model 452 may be coupled with other components of the computer device 400.

The above-described computing device 400 elements may be coupled to each other via system bus 412, which may represent one or more buses. In the case of multiple buses, they may be bridged by one or more bus bridges (not shown). Each of these elements may perform its conventional functions known in the art. In particular, system memory 404 and mass storage devices 406 may be employed to store a working copy and a permanent copy of the programming instructions for the operation of various components of computing device 400, including but not limited to an operating system of computing device 400, one or more applications, and/or operation associated with computing device 400 serving as PCSA infrastructure evaluator 102, ML model 150, PCSA infrastructure evaluator 202, ML model 214, resource analyzer 216, and/or network service analyzer 218, collectively denoted as computational logic 422. The various elements may be implemented by assembler instructions supported by processor(s) 402 or high-level languages that may be compiled into such instructions. In some embodiments, the computing device 400 may be implemented as a fixed function ASIC, a FPGA, or any other suitable device with or without programmability or configuration options.

The permanent copy of the programming instructions may be placed into mass storage devices 406 in the factory, or in the field through, for example, a distribution medium (not shown), such as a compact disc (CD), or through communication interface 410 (from a distribution server (not shown)). That is, one or more distribution media having an implementation of the agent program may be employed to distribute the agent and to program various computing devices.

The number, capability, and/or capacity of the elements 408, 410, 412 may vary, depending on whether computing device 400 is used as a stationary computing device, such as a set-top box or desktop computer, or a mobile computing device, such as a tablet computing device, laptop computer, game console, or smartphone. Their constitutions are otherwise known, and accordingly will not be further described.

In some embodiments, ML model 452 may be included with computational logic 422 or hardware accelerators of processor 402. For some embodiments, at least one of processors 402 may be packaged together with computational logic 422 configured to practice aspects of embodiments described herein to form a System in Package (SiP) or a System on Chip (SoC).

In various implementations, the computing device 400 may comprise one or more components of a data center, a laptop, a netbook, a notebook, an ultrabook, a smartphone, a tablet, an ultra mobile PC, or a mobile phone. In some embodiments, the computing device 400 include one or more components of a server. In further implementations, the computing device 400 may be any other electronic device that processes data.

Figure 5:
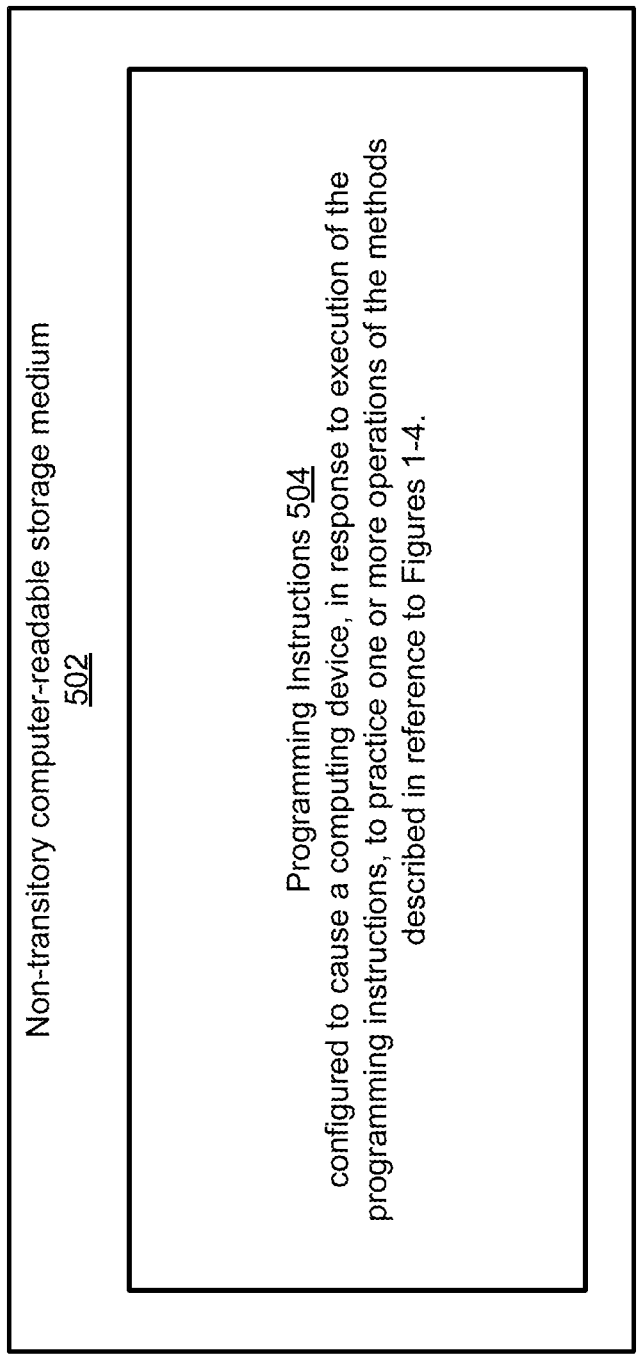
FIG. 5 illustrates an example storage medium with instructions configured to enable an apparatus to practice various aspects of the present disclosure, in accordance with various embodiments.

FIG. 5 illustrates example computer-readable storage medium 502 having instructions configured to practice all or selected ones of the operations associated with the computer device 400, earlier described with respect to FIG. 4; the apparatus 100 and/or the PCSA infrastructure evaluator 102 described with respect to FIG. 1; the PCSA infrastructure evaluator 202 described with respect to FIG. 2; and/or the technique 300 of FIG. 3, in accordance with various embodiments. As illustrated, computer-readable storage medium 502 may include a number of programming instructions 504. The storage medium 502 may represent a broad range of non-transitory persistent storage medium known in the art, including but not limited to flash memory, dynamic random access memory, static random access memory, an optical disk, a magnetic disk, etc. Programming instructions 504 may be configured to enable a device, e.g., computer device 400, PCSA infrastructure evaluator 102 and/or other components of the apparatus 100, and/or PCSA infrastructure evaluator 202 in response to execution of the programming instructions 504, to perform, e.g., but not limited to, various operations described for the ML model 150, the ML model 214, the resource analyzer 216, the network service analyzer 218, the computer device 400 of FIG. 4, or operations shown and/or described with respect to technique 300 of FIG. 3. In alternate embodiments, programming instructions 504 may be disposed on multiple computer-readable storage media 502. In an alternate embodiment, storage medium 502 may be transitory, e.g., signals encoded with programming instructions 504.

Referring back to FIG. 4, for an embodiment, at least one of processors 402 may be packaged together with memory having all or portions of computational logic 422 configured to practice aspects shown or described for the PCSA infrastructure evaluator 102 and/or other components of the apparatus 100 shown in FIG. 1, PCSA infrastructure evaluator 202 of FIG. 2, or operations shown or described with respect to technique 300 of FIG. 3. For an embodiment, at least one of processors 402 may be packaged together with memory having all or portions of computational logic 422 configured to practice aspects described for the PCSA infrastructure evaluator 102 and/or other components of the apparatus 100 shown in FIG. 1, PCSA infrastructure evaluator 202 of FIG. 2, or operations shown or described with respect to technique 300 of FIG. 3 to form a System in Package (SiP). For an embodiment, at least one of processors 402 may be integrated on the same die with memory having all or portions of computational logic 422 configured to practice aspects described for the PCSA infrastructure evaluator 102 and/or other components of the apparatus 100 shown in FIG. 1, PCSA 202 of FIG. 2, or operations shown or described with respect to technique 300 of FIG. 3. For an embodiment, at least one of processors 402 may be packaged together with memory having all or portions of computational logic 422 configured to practice aspects of the PCSA infrastructure evaluator 102 and/or other components of the apparatus 100 shown in FIG. 1, PCSA 202 of FIG. 2, or operations shown or described with respect to technique 300 of FIG. 3 to form a System on Chip (SoC).

Machine-readable media (including non-transitory machine-readable media, such as machine-readable storage media), methods, systems and devices for performing the above-described techniques are illustrative examples of embodiments disclosed herein. Additionally, other devices in the above-described interactions may be configured to perform various disclosed techniques.

EXAMPLES

Example 1 may include an apparatus for infrastructure management, comprising: an interface to receive a plurality of telemetry signals from first one or more infrastructure components of an infrastructure; and a policy controlled semi-autonomous (PCSA) infrastructure evaluator coupled with the interface, wherein the PCSA infrastructure evaluator includes a machine-learning (ML) model of a service level metric (SLM) deviation by second one or more infrastructure components of the infrastructure, and the PCSA infrastructure evaluator is to: determine a deviation from the SLM of third one or more infrastructure components of the infrastructure, based at least in part the ML model and one or more of the plurality of telemetry signals; and send a message to fourth one or more infrastructure components of the infrastructure based at least in part on the deviation from the SLM.

Example 2 may include the subject matter of Example 1, wherein the fourth one or more infrastructure components of the infrastructure are selected from a group that includes an orchestrator, a cloud computing fabric controller, a network functions virtualization (NFV) orchestrator (NFVO), a virtualized infrastructure manager (VIM), an operations support system (OSS), a business support system (BSS), or a management application.

Example 3 may include the subject matter of any one of Examples 1-2, wherein the deviation is a predicted future deviation at a first time and the PCSA infrastructure evaluator is to send the message at a second time before the first time.

Example 4 may include the subject matter of any one of Examples 1-3, wherein the message includes a recommended action.

Example 5 may include the subject matter of Example 4, wherein the recommended action includes one or more of creation of a new virtual machine (VM) or container instance, migration of an existing VM or container instance, scaling up of existing resources, or scaling down of existing resources.

Example 6 may include the subject matter of Example 4, wherein the PCSA infrastructure evaluator is also to determine fifth one or more infrastructure components to scale up, scale down, or duplicate based at least in part on one or more of an additional SLM or an updated SLM, wherein the recommended action is based at least in part on the determined fifth one or more infrastructure components.

Example 7 may include the subject matter of any one of Examples 4-6, wherein the PCSA infrastructure evaluator is also to determine whether permission is required for the recommended action based at least in part on one or more policy parameters of one or more infrastructure management policies, wherein the message includes a permission required indicator in response to a determination permission is required.

Example 8 may include the subject matter of any one of Examples 1-7, wherein the telemetry signals include one or more of processor telemetry signals, operating system telemetry signals, virtual switch telemetry signals, storage subsystem telemetry signals, host bus adapter telemetry signals, network interface card telemetry signals, platform telemetry signals, physical switch telemetry signals, or router telemetry signals.

Example 9 may include the subject matter of any one of Examples 1-8, wherein the SLM includes one or more of transactions per second, input/output (TO) operations per second, network packets per second, network bandwidth, or remote procedure calls (RPCs) per second.

Example 10 may include the subject matter of any one of Examples 1-9, wherein the SLM includes one or more resources requirements or commitments of a number of processor cores, a cache capacity, a memory capacity, a memory bandwidth, a network data communication throughput capacity, or a storage capacity of the third one or more network components of the network infrastructure.

Example 11 may include the subject matter of any one of Examples 1-10, wherein the deviation from the SLM is also based at least in part on one or more application parameters or virtual network function (VNF) parameters.

Example 12 may include the subject matter of any one of Examples 1-11, wherein the PCSA infrastructure evaluator is to determine the deviation from the SLM based at least in part on a compacted set of telemetry signals.

Example 13 may include the subject matter of Example 12, wherein the PCSA infrastructure evaluator is also to filter the plurality of telemetry signals from the first one or more infrastructure components to determine the compacted set of telemetry signals.

Example 14 may include the subject matter of Example 12, wherein the plurality of telemetry signals from the first one or more infrastructure components is the compacted set of telemetry signals.

Example 15 may include the subject matter of any one of Examples 1-14, wherein the SLM is a service level agreement (SLA) or a service level objective (SLO).

Example 16 may include a method of infrastructure control comprising: receiving a plurality of telemetry signals from one or more network components at a policy controlled semi-autonomous (PCSA) infrastructure evaluator; receiving one or more service level metrics (SLMs) at the PCSA infrastructure evaluator; determining, by the PCSA infrastructure evaluator, a recommended action based at least in part on a machine learning model of a SLM deviation and one or more of the plurality of telemetry signals; and sending, by the PCSA infrastructure evaluator, a message to one or more of an orchestrator, a cloud computing fabric controller, a network functions virtualization (NFV) orchestrator (NFVO), a virtualized infrastructure manager (VIM), an operations support system (OSS), a business support system (BSS), or a management application, wherein the message includes the recommended action.

Example 17 may include the subject matter of Example 16, further comprising determining, by the PCSA infrastructure evaluator, a predicted future deviation from one or more of the SLMs at a first time, wherein determining the recommended action is based at least in part on the predicted future deviation and wherein sending the message occurs at a second time before the first time.

Example 18 may include the subject matter of any one of Examples 16-17, wherein the recommended action includes one or more of creation of a new virtual machine (VM) or container instance, migration of an existing VM or container instance, scaling up of existing resources, or scaling down of existing resources.

Example 19 may include the subject matter of any one of Examples 16-18, further comprising receiving one or more policy parameters of one or more network infrastructure management policies at the PCSA infrastructure evaluator, wherein determining the recommended action is also based at least in part on one or more of the one or more policy parameters.

Example 20 may include the subject matter of Example 19, further comprising determining, by the PCSA infrastructure evaluator, whether permission is required for the recommended action based at least in part on one or more of the one or more policy parameters, wherein the message includes a permission required indicator in response to a determination that permission is required.

Example 21 may include the subject matter of any one of Examples 16-20, wherein the plurality of telemetry signals include telemetry signals from a plurality of servers.

Example 22 may include the subject matter of any one of Examples 16-21, wherein the telemetry signals include one or more of processor telemetry signals, operating system telemetry signals, virtual switch telemetry signals, storage subsystem telemetry signals, host bus adapter telemetry signals, network interface card telemetry signals, platform telemetry signals, physical switch telemetry signals, or router telemetry signals.

Example 23 may include one or more non-transitory computer-readable media comprising instructions that cause an apparatus for infrastructure management, in response to execution of the instructions by the apparatus, to: determine a deviation from a service level metric (SLM) based at least in part on a machine-learning (ML) model of a SLM deviation and one or more of a plurality of telemetry signals; and send a message to one or more of an orchestrator, a cloud computing fabric controller, a network functions virtualization (NFV) orchestrator (NFVO), a virtualized infrastructure manager (VIM), an operations support system (OSS), a business support system (BSS), or a management application, based at least in part on the deviation from the SLM.

Example 24 may include the subject matter of Example 23, wherein the deviation is a predicted future deviation at a first time and the instructions are to cause the apparatus to send the message at a second time before the first time.

Example 25 may include the subject matter of any one of Examples 23-24, wherein the message includes a recommended action.

Example 26 may include the subject matter of Example 25, wherein the recommended action includes one or more of creation of a new virtual machine (VM) or container instance, migration of an existing VM or container instance, scaling up of existing resources, or scaling down of existing resources.

Example 27 may include the subject matter of any one of Examples 25-26, wherein the instructions are also to cause the apparatus to determine whether permission is required for the recommended action based at least in part on one or more policy parameters, wherein the message includes a permission required indicator in response to a determination permission is required.

Example 28 may include the subject matter of any one of Examples 23-27, wherein the telemetry signals include one or more of processor telemetry signals, operating system telemetry signals, virtual switch telemetry signals, storage subsystem telemetry signals, host bus adapter telemetry signals, network interface card telemetry signals, platform telemetry signals, physical switch telemetry signals, or router telemetry signals.

Example 29 may include the subject matter of any one of Examples 23-28, wherein the SLM includes one or more of a number of processor cores, a cache capacity, a memory capacity, a memory bandwidth, a network data communication throughput capacity, or a storage capacity.

Example 30 may include the subject matter of any one of Examples 23-29, wherein the deviation from the SLM is also based at least in part on one or more application parameters or virtual network function (VNF) parameters.

Example 31 may include an apparatus for infrastructure control comprising: means for receiving a plurality of telemetry signals from one or more network components; means for receiving one or more service level metrics (SLMs); means for determining a recommended action based at least in part on a machine learning model of a SLM deviation and one or more of the plurality of telemetry signals; and means for sending a message to one or more of an orchestrator, a cloud computing fabric controller, a network functions virtualization (NFV) orchestrator (NFVO), a virtualized infrastructure manager (VIM), an operations support system (OSS), a business support system (BSS), or a management application, wherein the message includes the recommended action.

Example 32 may include the subject matter of Example 31, further comprising means for determining a predicted future deviation from one or more of the SLMs at a first time, wherein the means for determining the recommended action is to determine the recommended action based at least in part on the predicted future deviation and wherein the means for sending the message is to send the message at a second time before the first time.

Example 33 may include the subject matter of any one of Examples 31-32, wherein the recommended action includes one or more of creation of a new virtual machine (VM) or container instance, migration of an existing VM or container instance, scaling up of existing resources, or scaling down of existing resources.

Example 34 may include the subject matter of any one of Examples 31-33, further comprising means for receiving one or more policy parameters of one or more network infrastructure management policies, wherein the means for determining the recommended action is also to determine the recommended action based at least in part on one or more of the one or more policy parameters.

Example 35 may include the subject matter of Example 34, further comprising means for determining whether permission is required for the recommended action based at least in part on one or more of the one or more policy parameters, wherein the message includes a permission required indicator in response to a determination that permission is required.

Example 36 may include the subject matter of any one of Examples 31-35, wherein the plurality of telemetry signals include telemetry signals from a plurality of servers.

Example 37 may include the subject matter of any one of Examples 31-36, wherein the telemetry signals include one or more of processor telemetry signals, operating system telemetry signals, virtual switch telemetry signals, storage subsystem telemetry signals, host bus adapter telemetry signals, network interface card telemetry signals, platform telemetry signals, physical switch telemetry signals, or router telemetry signals.

Example 38 may include the subject matter of any one of Examples 1-15, wherein the first one or more infrastructure components and the third one or more infrastructure components are the same.

Example 39 may include the subject matter of any one of Examples 1-15, wherein the second one or more infrastructure components and the third one or more infrastructure components are the same.

Example 40 may include the subject matter of any one of Examples 1-15, wherein the first one or more infrastructure components, the second one or more infrastructure components, and the third one or more infrastructure components are the same.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

We claim:

1. An apparatus for infrastructure management, comprising:
    circuitry to receive a plurality of telemetry signals from one or more infrastructure components of an infrastructure; and
    second circuitry coupled with interface circuitry, wherein the second circuitry includes a machine-learning (ML) model of a service level metric (SLM) deviation by one or more infrastructure components of the infrastructure, and the second circuitry is to:
        determine a deviation from the SLM of the one or more infrastructure components of the infrastructure, based at least in part the ML model and one or more of the plurality of telemetry signals;
        send a message to an infrastructure manager based at least in part on the deviation from the SLM, wherein the message is to cause the infrastructure manager to selectively modify operations in two or more infrastructure components of the infrastructure, wherein the message includes a recommended action;
        determine whether permission is to be requested for the recommended action based at least in part on one or more policy parameters of one or more infrastructure management policies; and
        based on a determination that permission is to be requested for the recommended action, request permission to perform the requested action.

2. The apparatus of claim 1, wherein the infrastructure manager includes one or more of: an orchestrator, a cloud computing fabric controller, a network functions virtualization (NFV) orchestrator (NFVO), a virtualized infrastructure manager (VIM), an operations support system (OSS), a business support system (BSS), or a management application.

3. The apparatus of claim 1, wherein the deviation is a predicted future deviation at a first time and the second circuitry is to send the message at a second time before the first time.

4. The apparatus of claim 1, wherein the recommended action includes one or more of creation of a new virtual machine (VM) or container instance, migration of an existing VM or container instance, scaling up of existing resources, or scaling down of existing resources.

5. The apparatus of claim 1, wherein the second circuitry is to determine one or more infrastructure components to scale up, scale down, or duplicate based at least in part on one or more of an additional SLM or an updated SLM, wherein the recommended action is based at least in part on the determined one or more infrastructure components.

6. The apparatus of claim 1, wherein the telemetry signals include one or more of processor telemetry signals, operating system telemetry signals, virtual switch telemetry signals, storage subsystem telemetry signals, host bus adapter telemetry signals, network interface card telemetry signals, platform telemetry signals, physical switch telemetry signals, or router telemetry signals.

7. The apparatus of claim 1, wherein the SLM includes one or more of transactions per second, input/output (TO) operations per second, network packets per second, network bandwidth, or remote procedure calls (RPCs) per second.

8. The apparatus of claim 1, wherein the SLM includes one or more resources requirements or commitments of a number of processor cores, a cache capacity, a memory capacity, a memory bandwidth, a network data communication throughput capacity, or a storage capacity of the one or more network components of a network infrastructure.

9. The apparatus of claim 1, wherein the deviation from the SLM is based at least in part on one or more application parameters or virtual network function (VNF) parameters.

10. The apparatus of claim 1, wherein the second circuitry is to determine the deviation from the SLM based at least in part on a compacted set of telemetry signals.

11. The apparatus of claim 10, wherein the second circuitry is also to filter the plurality of telemetry signals from the one or more infrastructure components to determine the compacted set of telemetry signals.

12. The apparatus of claim 10, wherein the plurality of telemetry signals from the one or more infrastructure components comprises the compacted set of telemetry signals.

13. The apparatus of claim 1, wherein the SLM is a service level agreement (SLA) or a service level objective (SLO).

14. A method of infrastructure control comprising:
    receiving a plurality of telemetry signals from one or more components at a policy controlled infrastructure evaluator;
    receiving one or more service level metrics (SLMs) at the infrastructure evaluator;
    determining, by the infrastructure evaluator, a recommended action based at least in part on a machine learning model of an SLM deviation and one or more of the plurality of telemetry signals;
    determining whether permission for the recommended action is to be requested based at least in part on one or more policy parameters;
    based on a determination that permission for the recommended action is to be requested, request permission to perform the recommended action; and
    sending, by the infrastructure evaluator, a message to one or more of an orchestrator, a cloud computing fabric controller, a network functions virtualization (NFV) orchestrator (NFVO), a virtualized infrastructure manager (VIM), an operations support system (OSS), a business support system (BSS), or a management application, wherein the message includes the recommended action and wherein the message includes a permission request indicator in response to a determination permission is to be requested.

15. The method of claim 14, further comprising determining, by the infrastructure evaluator, a predicted future deviation from one or more of the SLMs at a first time, wherein determining the recommended action is based at least in part on the predicted future deviation and wherein sending the message occurs at a second time before the first time.

16. The method of claim 14, wherein the recommended action includes one or more of creation of a new virtual machine (VM) or container instance, migration of an existing VM or container instance, scaling up of existing resources, or scaling down of existing resources.

17. The method of claim 14, further comprising receiving one or more policy parameters of one or more network infrastructure management policies at the infrastructure evaluator, wherein determining the recommended action is also based at least in part on one or more of the one or more policy parameters.

18. One or more non-transitory computer-readable media comprising instructions that cause an apparatus, in response to execution of the instructions by the apparatus, to:
   determine a deviation from a service level metric (SLM) based at least in part on a machine-learning (ML) model of a SLM deviation and one or more of a plurality of telemetry signals;
   send a message to an infrastructure manager, based at least in part on the deviation from the SLM, wherein the message is to cause the infrastructure manager to selectively modify operations in two or more infrastructure components, wherein the message includes a recommended action;
   determine whether permission is to be requested for the recommended action based at least in part on one or more policy parameters of one or more infrastructure management policies; and
   based on a determination that permission is to be requested for the recommended action, request permission to perform the requested action.

19. The one or more non-transitory computer-readable media of claim 18, wherein the deviation is a predicted future deviation at a first time and the instructions are to cause the apparatus to send the message at a second time before the first time.

20. The one or more non-transitory computer-readable media of claim 18, wherein the recommended action includes one or more of creation of a new virtual machine (VM) or container instance, migration of an existing VM or container instance, scaling up of existing resources, or scaling down of existing resources.

21. The one or more non-transitory computer-readable media of claim 18, wherein the telemetry signals include one or more of processor telemetry signals, operating system telemetry signals, virtual switch telemetry signals, storage subsystem telemetry signals, host bus adapter telemetry signals, network interface card telemetry signals, platform telemetry signals, physical switch telemetry signals, or router telemetry signals.

* * * * *